(12) United States Patent
Takano et al.

(10) Patent No.: US 9,569,344 B2
(45) Date of Patent: Feb. 14, 2017

(54) TESTING SYSTEM FOR A MOBILE OBJECT IN A NAVIGATION MAP

(71) Applicant: Hitachi, Ltd., Tokyo (JP)

(72) Inventors: Hideki Takano, Kawasaki (JP); Tsuneo Sobue, Tokyo (JP); Shunichiro Furuhata, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 945 days.

(21) Appl. No.: 13/895,814

(22) Filed: May 16, 2013

(65) Prior Publication Data

US 2013/0311128 A1 Nov. 21, 2013

(30) Foreign Application Priority Data

May 18, 2012 (JP) .................................. 2012-114229

(51) Int. Cl.
G06F 11/36 (2006.01)

(52) U.S. Cl.
CPC ....... *G06F 11/3688* (2013.01); *G06F 11/3684* (2013.01); *G06F 11/3696* (2013.01)

(58) Field of Classification Search
None
See application file for complete search history.

(56) References Cited

U.S. PATENT DOCUMENTS

| 2004/0128071 A1* | 7/2004 | Schradi | G01S 5/14 701/472 |
| 2007/0043980 A1* | 2/2007 | Ohashi | G06F 11/3684 714/45 |
| 2011/0046883 A1* | 2/2011 | Ross | G01C 21/26 701/533 |
| 2012/0303270 A1* | 11/2012 | Su | G01C 21/3415 701/431 |

FOREIGN PATENT DOCUMENTS

JP 2007-052703 3/2007

* cited by examiner

*Primary Examiner* — Paul D Lee
*Assistant Examiner* — Mark Crohn
(74) *Attorney, Agent, or Firm* — Foley & Lardner LLP

(57) ABSTRACT

An example of the invention is a test support system for supporting testing of a function of a program that works depending on a position of a mobile object in map information. A storage device holds event generation requirements information defining requirements for generation of an event in the program. The requirements specify a position designated in the map information and requirements on movement of the mobile object with respect to the designated position. A processor creates a plurality of test cases to be referred to in creating test data to be input to the program for checking whether the event is generated in accordance with the requirements with reference to the map information and the requirements. Each of the plurality of test cases specifies the designated position in the map information and movement of the mobile object with respect to the designated position.

14 Claims, 14 Drawing Sheets

| | EVENT GENERATION REQUIREMENTS 107 | |
|---|---|---|
| 301 CATEGORY | 302 ITEM | 303 VALUE |
| AREA | LATITUDE AND LONGITUDE OF NORTHEAST CORNER | (35.4016,139.5414) |
| | LATITUDE AND LONGITUDE OF SOUTHWEST CORNER | (35.4011,139.5409) |
| | TIMING | AT ENTERING FROM WEST BOUNDARY |
| VEHICLE | SPEED | 60km/h OR MORE |
| | ACCELERATION | — |
| | DIRECTION | 70 TO 110 DEGREES |

TEST POLICY

| 401 CATEGORY | 402 ITEM | 403 POLICY |
|---|---|---|
| AREA | TRACKS MATCHING EVENT GENERATION REQUIREMENTS | CONDUCT ON ALL TRACKS |
| | TRACKS MISMATCHING EVENT GENERATION REQUIREMENTS | CONDUCT ON TRACKS MEETING EVENT GENERATION REQUIREMENTS ON DIRECTION |
| VEHICLE | SPEED | DEFAULT: LEGAL SPEED LIMIT<br>LIMITS: 1km/h, 150km/h |
| | ACCELERATION | DEFAULT: 0m/s^2<br>LIMITS: 8m/s^2 |
| | DIRECTION | DEFAULT: INTERMEDIATE VALUE OF EVENT GENERATION REQUIREMENTS |
| GPS | ACQUISITION CYCLE | ONE SECOND |
| | ACQUISITION TIMING | SHIFT BY ACQUISITION CYCLE / 3 |

FIG. 4

| DRIVING TRACK PATTERNS 701 | |
|---|---|
| DRIVING TRACK 702 | MATCH/MISMATCH WITH EVENT GENERATION REQUIREMENTS 703 |
| 531 | MATCH |
| 532 | MISMATCH |
| 533 | MISMATCH |
| 534 | MISMATCH |
| ... | ... |

FIG. 7B

| VEHICLE SPEED PATTERNS 710 | |
|---|---|
| VEHICLE SPEED 711 | MATCH/MISMATCH WITH EVENT GENERATION REQUIREMENTS 712 |
| 60km/h | MATCH |
| 59km/h | MISMATCH |
| 61km/h | MATCH |
| LEGAL SPEED LIMIT (70km/h) | MATCH |
| 1km/h | MISMATCH |
| 150km/h | MATCH |

FIG. 7C

| VEHICLE ACCELERATION PATTERNS 704 | |
|---|---|
| VEHICLE ACCELERATION 705 | MATCH/MISMATCH WITH EVENT GENERATION REQUIREMENTS 706 |
| 8m/s^2 | MATCH |
| 0m/s^2 | MATCH |

| VEHICLE DIRECTION PATTERNS | |
|---|---|
| VEHICLE DIRECTION (714) | MATCH/MISMATCH WITH EVENT GENERATION REQUIREMENTS (715) |
| 90 DEGREES | MATCH |
| 70 DEGREES | MATCH |
| 110 DEGREES | MATCH |
| 69 DEGREES | MISMATCH |
| 111 DEGREES | MISMATCH |

| GPS ACQUISITION TIMING PATTERNS | |
|---|---|
| GPS ACQUISITION TIMING (708) | MATCH/MISMATCH WITH EVENT GENERATION REQUIREMENTS (709) |
| START ACQUISITION 0 Sec. AFTER | MATCH |
| START ACQUISITION 1/3 Sec. AFTER | MATCH |
| START ACQUISITION 2/3 Sec. AFTER | MATCH |

FIG. 7F

| 717 TEST CASES | | | | | |
|---|---|---|---|---|---|
| 718 DRIVING TRACK | 719 VEHICLE SPEED | 720 VEHICLE ACCELERATION | 721 VEHICLE DIRECTION | 722 GPS ACQUISITION TIMING | 723 MATCH/ MISMATCH WITH EVENT GENERATION REQUIREMENTS |
| [1] | 60km/h | 0m/s^2 | 90 DEGREES | START ACQUISITION 0 Sec. AFTER | MATCH |
| [1] | 60km/h | 0m/s^2 | 90 DEGREES | START ACQUISITION 1/3 Sec. AFTER | MATCH |
| [1] | 60km/h | 0m/s^2 | 90 DEGREES | START ACQUISITION 2/3 Sec. AFTER | MATCH |
| [1] | 60km/h | 0m/s^2 | 80 DEGREES | START ACQUISITION 0 Sec. AFTER | MATCH |
| [1] | 60km/h | 0m/s^2 | 80 DEGREES | START ACQUISITION 1/3 Sec. AFTER | MATCH |
| [1] | 60km/h | 0m/s^2 | 80 DEGREES | START ACQUISITION 2/3 Sec. AFTER | MATCH |
| [1] | 60km/h | 0m/s^2 | 110 DEGREES | START ACQUISITION 0 Sec. AFTER | MATCH |
| [1] | 60km/h | 0m/s^2 | 110 DEGREES | START ACQUISITION 1/3 Sec. AFTER | MATCH |
| [1] | 60km/h | 0m/s^2 | 110 DEGREES | START ACQUISITION 2/3 Sec. AFTER | MATCH |
| [1] | 60km/h | 0m/s^2 | 79 DEGREES | START ACQUISITION 0 Sec. AFTER | MISMATCH |
| [1] | 60km/h | 0m/s^2 | 79 DEGREES | START ACQUISITION 1/3 Sec. AFTER | MISMATCH |
| [1] | 60km/h | 0m/s^2 | 79 DEGREES | START ACQUISITION 2/3 Sec. AFTER | MISMATCH |
| ... | ... | ... | ... | ... | ... |

FIG. 7G

TESTING SYSTEM FOR A MOBILE OBJECT IN A NAVIGATION MAP

CLAIM OF PRIORITY

The present application claims priority from Japanese patent application JP2012-114229 filed on May 18, 2012, the content of which is hereby incorporated by reference into this application.

BACKGROUND

This invention relates to a test support system, a test support method, and a program. In particular, this invention relates to a technique to support testing of a program for performing a function in a mobile object, such as a mobile information terminal or a car navigation terminal.

In testing a program, a program developer runs a subject program under various conditions to check whether the program works properly as required under the various conditions. The testing may take 50% of the overall time to develop a program and is burdensome.

For example, JP 2007-52703 A discloses a test scenario generation program that makes a computer execute a test scenario generation method that generates a test scenario for use in verification of an application involving screen change.

This program makes a computer execute a design information acquisition step that acquires design information of the application, a test scenario template information generation step that generates test scenario template information having a part of information of the test scenario based on the design information and a previously set generation rule, and a test scenario setting step that sets the result of the setting that has been made for the test scenario template information based on the design information as the test scenario.

In the meanwhile, there exist functions using the GPS (Global Positioning System) or other position measurement system utilizing WiFi™ (Wireless Fidelity) base stations or mobile-phone base stations to perform a certain operation when a mobile phone or a car navigation terminal is positioned at a specific geographic point or is in a specific moving state. For example, functions such as generating an alarm about a dangerous spot and delivering an advertisement are known.

In the technology of car navigation systems, it is demanded to provide a car navigation system customized in accordance with user requirements. Various functions are implemented to meet various user requirements; each of the various functions needs to be tested.

In testing such functions, it is difficult to take a mobile phone or a car navigation terminal to a specific place to conduct the testing under various conditions. For this reason, the testing of a program function prepares dummy data of positional information to emulate the behavior at the position and inputs the dummy data to the subject program.

However, in the circumstance where developers individually create dummy data necessary for the testing, the developers have to study all possible test cases and further, have to create test cases to create necessary and sufficient dummy data; their workloads are heavy. The method of generating a test scenario according to the aforementioned JP 2007-52703 A does not consider the conditions related to geographic positions; consequently, a program configured to execute certain processing depending on the geographic position might perform a different operation from the actual one during the testing.

SUMMARY

An aspect of the invention is a test support system for supporting testing of a function of a program that works depending on a position of a mobile object in map information. The test support system includes a processor and a storage device. The storage device holds the map information and event generation requirements information defining requirements for generation of an event in the program. The requirements for event generation specify a position designated in the map information and requirements on movement of the mobile object with respect to the designated position. The processor creates a plurality of test cases to be referred to in creating test data to be input to the program for checking whether the event is generated in accordance with the requirements for event generation with reference to the map information and the event generation requirements, each of the plurality of test cases specifying the designated position in the map information and movement of the mobile object with respect to the designated position.

An aspect of this invention achieves reduction in workload in testing whether a function of a mobile object depending on the position in geographic information works properly as required. The problems, configurations, and effects other than those described above are clarified by the following description of embodiments.

BRIEF DESCRIPTION OF THE DRAWINGS

FIG. 3 illustrates a configuration example of an event generation requirements table in the embodiment;

FIG. 4 illustrates a configuration example of a test policy table in the embodiment;

FIG. 7B is a diagram illustrating examples of driving track patterns created at driving track pattern creation step in the embodiment;

FIG. 7C is a diagram illustrating examples of vehicle speed patterns created at vehicle speed pattern creation step in the embodiment;

FIG. 7D is a diagram illustrating examples of vehicle acceleration patterns created at vehicle acceleration pattern creation step in the embodiment;

FIG. 7E is a diagram illustrating examples of vehicle direction patterns created at vehicle direction pattern creation step in the embodiment;

FIG. 7F is a diagram illustrating examples of GPS acquisition timing patterns created at GPS acquisition timing pattern creation step in the embodiment;

FIG. 7G is a diagram illustrating test cases created from the patterns of FIGS. 7B to 7F by the test case creation program in the embodiment;

DETAILED DESCRIPTION OF THE EMBODIMENTS

Figure 1:
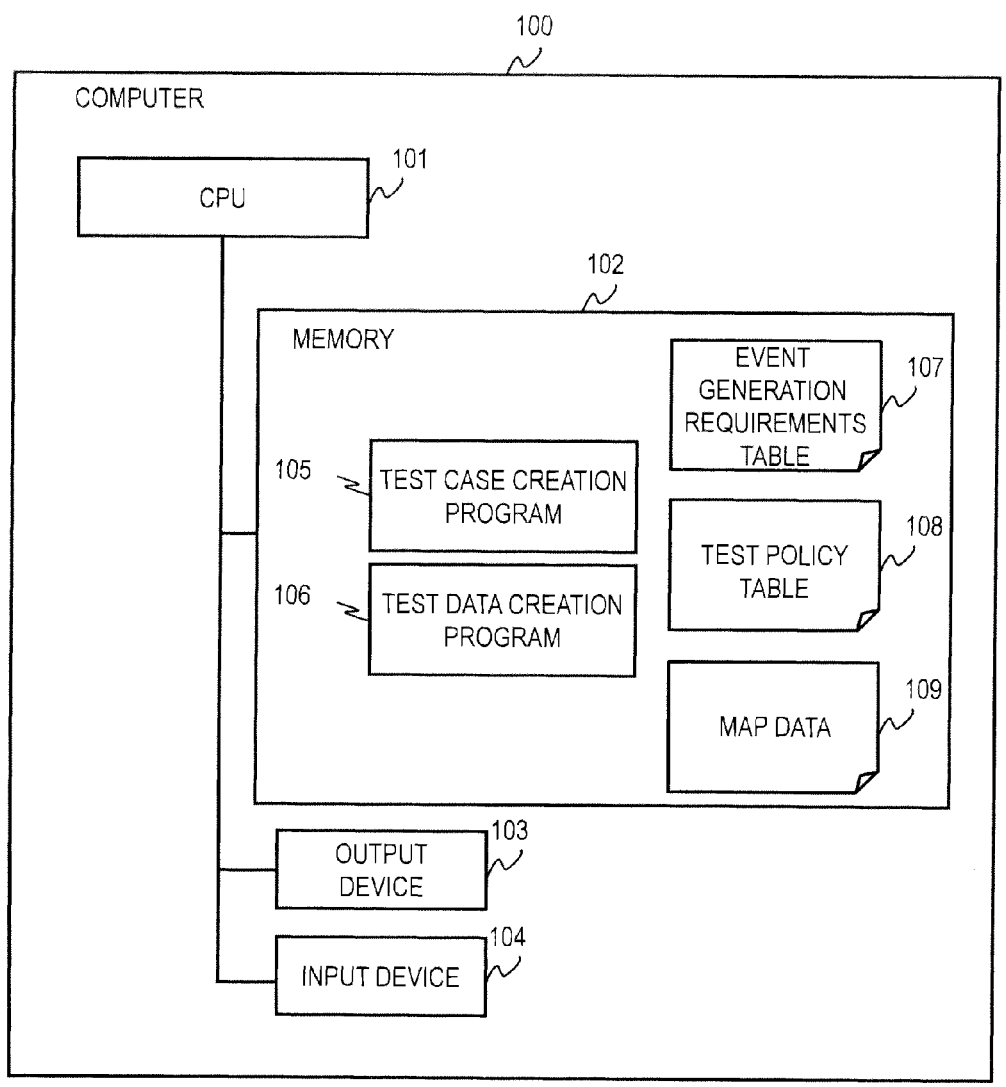
FIG. 1 is a block diagram schematically illustrating a configuration of a computer of a test support system in an embodiment.

Hereinafter, embodiments of this invention are described with reference to the accompanying drawings. The following description and the accompanying drawings provide specific embodiments and implementations based on the principle of this invention; however, these are for understanding of this invention and are never used to interpret this invention in a limited way.

The embodiments provide explanation in sufficient detail for a person skilled in the art to implement this invention; however, it should be understood that other implementations and embodiments are available, in which modifications of the configuration or the structure, or various replacements of the elements are available without departing from the scope and the spirit of the technical idea of this invention. Accordingly, the following description should not be interpreted as limited thereto.

As will be described later, the embodiments of this invention may be implemented by software running on a general-purpose computer. Alternatively, they may be implemented by dedicated hardware or a combination of software and hardware.

In the following description, the information used in the embodiments is explained in the form of tables; however, it does not need to be expressed in a data structure of tables but may be expressed in data structures of lists, DBs, queues, and others. In order to indicate independency from the data structure, a table, a list, a DB, a queue, or the like may be merely referred to as information. In explaining the information, terms such as identification information, identifier, name, and ID are used; these are replaceable with one another.

Hereinafter, explanation about processing in the embodiments of this invention is provided with a subject (agent) of program; however, since a program is executed by a processor to perform predetermined processing using a memory and a communication port (communication control device), the processor can be the subject of the explanation.

The processing disclosed with the subject of program may be the processing performed by a computer or an information processing apparatus. A part or all of a program may be implemented by dedicated hardware or may be configured as a module. A program may be installed in the computer or the information processing apparatus through a program distribution server or a non-transitory storage medium.

A processor operates in accordance with a program to function as a functional part for performing a predetermined function. For example, the processor operates in accordance with a control program to function as a controller and operates in accordance with a management program to function as a manager. An apparatus and a system including the processor are the apparatus and the system including these functional parts.

The embodiments disclose techniques to support testing of a program for implementing a function of a mobile terminal (included in the mobile object) such as a mobile information terminal (including a mobile phone) or a car navigation terminal. The techniques in the embodiments support the testing of a program which refers to map data to execute a specific event depending on the current position of the mobile object in the map data. The event is processing executed by a specific function of the program when predetermined requirements are satisfied. The function is activated to perform the processing, so that the event occurs.

The embodiments are applicable to testing of various functions (events generated by the functions) that work depending on the position of the mobile object in map data. An example of the function to be tested is a function, in a navigation system for a vehicle or a person, to notify the user of a danger by outputting a pop-up image on the display of the mobile terminal (such as a car navigation terminal or a mobile information terminal) or by outputting a sound when the mobile terminal is approaching a dangerous spot. This output is the event.

Another example is a function to pop up information on a specific shop on the display of the mobile terminal when the mobile terminal is approaching the shop. Still another example is a function to control the speed of the mobile object depending on the current position in the map data and movement of the mobile object. For example, when a vehicle is driving faster than a specified speed before a sharp curve, the function slows down the vehicle.

In the embodiments, program testing inputs test data including positional changes in the map data to the program to determine whether the function of the program to be tested works as required (whether the event occurs as required). The program testing in the embodiments can create test data automatically from a test case or by moving the mobile object in accordance with the test case. The test case represents the movement of the mobile object with respect to a designated spot.

The program test support method in this embodiment automatically creates a plurality of systematic test cases from various requirements given to the program with the movement of the mobile object. Each test case specifies a track (positional changes) of the mobile object in the map data and behavior (such as a speed and a direction) of the mobile terminal representing the movement of the mobile object. This creation of test cases reduces the workload in testing whether the function of the mobile object depending on the position in the map data works properly as required.

In the embodiments, an example of the test support method automatically creates test data (dummy data for emulation) from the created test cases. This reduces the workload in testing. The program testing inputs test data associated with each test case to the subject program and checks whether the function of the program works properly in each test case to detect a bug in the program, aiming at improved quality of the program.

Embodiment 1

Hereinafter, provided is an example that automatically creates test cases for a program running on a car navigation terminal and operating depending on the geographic position in map data and driving conditions representing the behavior of the vehicle in order to save labor in testing a function (generation of an event) of the program. In the example described hereinafter, a test case specifies movement of the vehicle. In this example, a test case specifies a track and behavior of the vehicle. Furthermore, the following example automatically creates test data (dummy data) to be used in testing each test case (in testing the function of the subject program) from the created test cases.

The dummy data represents a track and behavior (such as a direction and a speed) of the vehicle. The dummy data may be for data acquired only through the GPS (Global Positioning System). For example, from point sequence data of latitudinal and longitudinal coordinates acquired through the GPS, data of a track, a speed (the interval between consecutive points), an acceleration (the variation in the interval between consecutive points), and a direction (the angle made by the point sequence) can be acquired.

Alternatively, the dummy data may be for data acquired through a plurality of devices. For example, the track data, the speed data, the acceleration data, and the direction data are acquired through a GPS device, a speed meter device of the vehicle, an acceleration sensor of the vehicle, and a geomagnetic sensor of the vehicle, respectively.

FIG. 1 is a block diagram illustrating an example of the test support system in this embodiment. In this example, the test support system is a computer 100. The test support system may include a plurality of computers.

As illustrated in FIG. 1, the computer 100 includes a CPU 101, which is a processor for executing programs; a memory 102, which is a primary storage device for storing the programs and data used by the programs; an output device 103 such as a display or a printer; and an input device 104 such as a keyboard or a mouse.

The memory 102 holds a test support program. The test support program holds a test case creation program 105 and a test data creation program 106 together with an event generation requirements table 107, a test policy table 108, and map data 109, which are data (information) to be referred to by the programs.

The programs and the data to be referred to by the programs are shown in the memory 102 of the primary storage device for convenience of explanation but typically, these are loaded to the storage area of the memory 102 from the storage area of a secondary storage device (not shown). The secondary storage device is a storage device including a non-volatile non-transitory storage medium for storing programs and data necessary to perform predetermined functions. The secondary storage device may be an external storage device connected via a network. In this embodiment, the term storage device includes the primary storage device, the secondary storage device, and the combination thereof.

Figure 2:
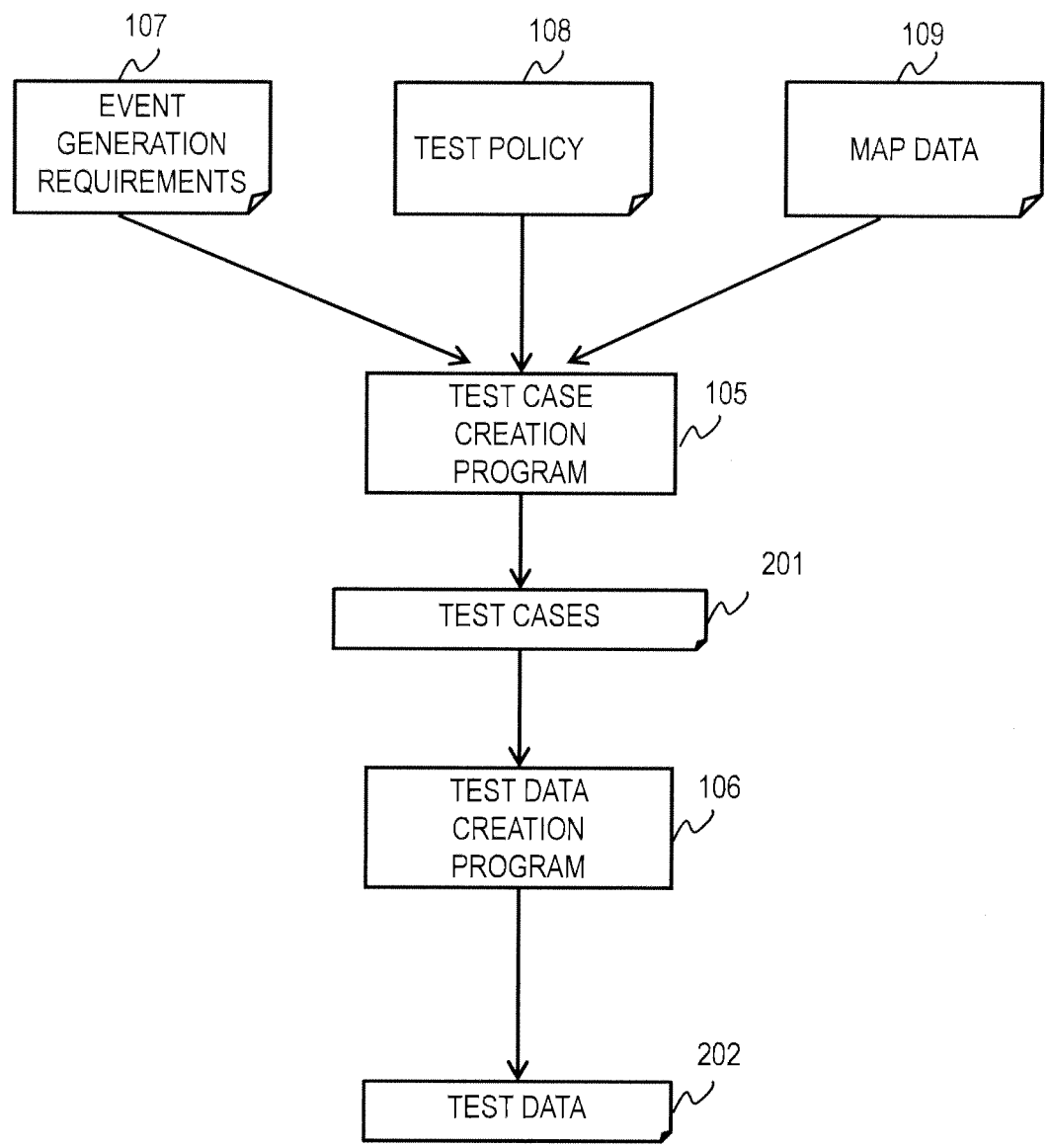
FIG. 2 illustrates a data flow in creating test cases and further creating test data from the test cases by the test support system in the embodiment.

FIG. 2 illustrates a data flow in creating test cases and further creating test data from the test cases by the test support system 100 in this example. The test support system 100 creates test cases 201 with reference to the event generation requirements table 107, the test policy table 108, and the map data 109. Furthermore, it creates test data 202 from each of the created test cases 201.

Specifically, the test case creation program 105 acquires the event generation requirements table 107, the test policy table 108, and the map data 109 to create test cases 201 from these. The test data creation program 106 acquires the created test cases 201 to create test data 202 from each of the test cases 201.

The event generation requirements table 107, the test policy table 108, and the map data 109 are input data to the test case creation program 105 and each test case 201 is input data to the test data creation program 106.

As previously mentioned, the test data is input data to the car navigation program to be tested and includes data on the track and behavior of the vehicle in this example. The data on the track may include information on tracks on the roads defined in the map data 109 and the directions of the tracks (driving directions on the roads). The data on the behavior may include information on the speed, the acceleration, and the direction of the vehicle. The data on the track and the data on the behavior can be independently input to the car navigation program.

The event generation requirements table 107 in this example defines requirements for a software function to execute predetermined processing (generate a predetermined event), or requirements for generating the event, in accordance with the geographic position (the position in the map) of the vehicle and the behavior of the vehicle. The result of the processing is the event.

FIG. 3 illustrates a configuration example of the event generation requirements table 107. This example shows event generation requirements for the function of alarming the driver. Specifically, the function is to alarm the driver with the output device (a display device and/or a sound output device) of the car navigation system when, in the case where there is a sharp curve ahead in the driving direction, the vehicle has reached a point at a predetermined distance from the sharp curve; the event generation requirements table 107 indicates the event generation requirements for this function.

The event generation requirements table 107 has a category column 301, an item column 302, and a value column 303. The category column 301 stores categories for categorizing the items of the event generation requirements (the values in the item column 302). This example defines two categories: one is "area" and the other is "vehicle". The item column 302 stores the items of the event occurrence requirements belonging to each category. The value column 303 indicates the values for the items in the item column 302.

In the example of FIG. 3, the requirement items under the category "area" have requirements on the area to invoke the alarm function (to generate the event), specifically, requirements on the area and the timing of checking the requirements in this area (the timing of invoking the function). This example specifies the area by a rectangle defined by the latitude and the longitude of the northeast corner and the latitude and the longitude of the southwest corner and further specifies the timing of checking the requirements at the time when the vehicle reaches the west boundary (the line connecting the northwest corner and the southwest corner) of this area.

The requirement items under the category "vehicle" have requirements on the behavior of the vehicle to invoke the alarm function (generate the event). This example specifies the requirement on the speed of the vehicle at 60 km/h or more and the requirement on the direction of the vehicle within 70 to 110 degrees clockwise from the north (from the northeast to the southeast). The requirement on the acceleration of the vehicle is not applied.

The alarm function in this example outputs an alarm if the vehicle is driving in the direction of 70 to 110 degrees clockwise from the north at the speed of 60 km/h or more when the vehicle enters the rectangular area, which is defined by the values of the latitude and longitude of the northeast corner and the values of the latitude and longitude of the southwest corner held in the value column 303, from the west boundary (west end).

Although this example expresses the event generation requirements in a table, they may be expressed in a different format such as CSV (Comma-Separated Values) or XML (Extensible Markup Language). In this example, the area according to the event generation requirements table 107 is a rectangle defined by the latitude and longitude of the northeast corner and the latitude and longitude of the southwest corner, but the area may be a circle defined by the latitude and longitude of its center and the radius or a polygon defined by a set of longitudes and latitudes. As to the event generation requirements, the timing of checking the requirements may be specified as the time of exit from the area or the time of reach to a predetermined point in the area, other than the time of entering the area.

The event generation requirements depend on the function. In an example, only the requirements on the area may be specified. In another example, only part of the three items related to the vehicle may be specified. The requirements on the position may be specified with a line or a point.

Figure 5:
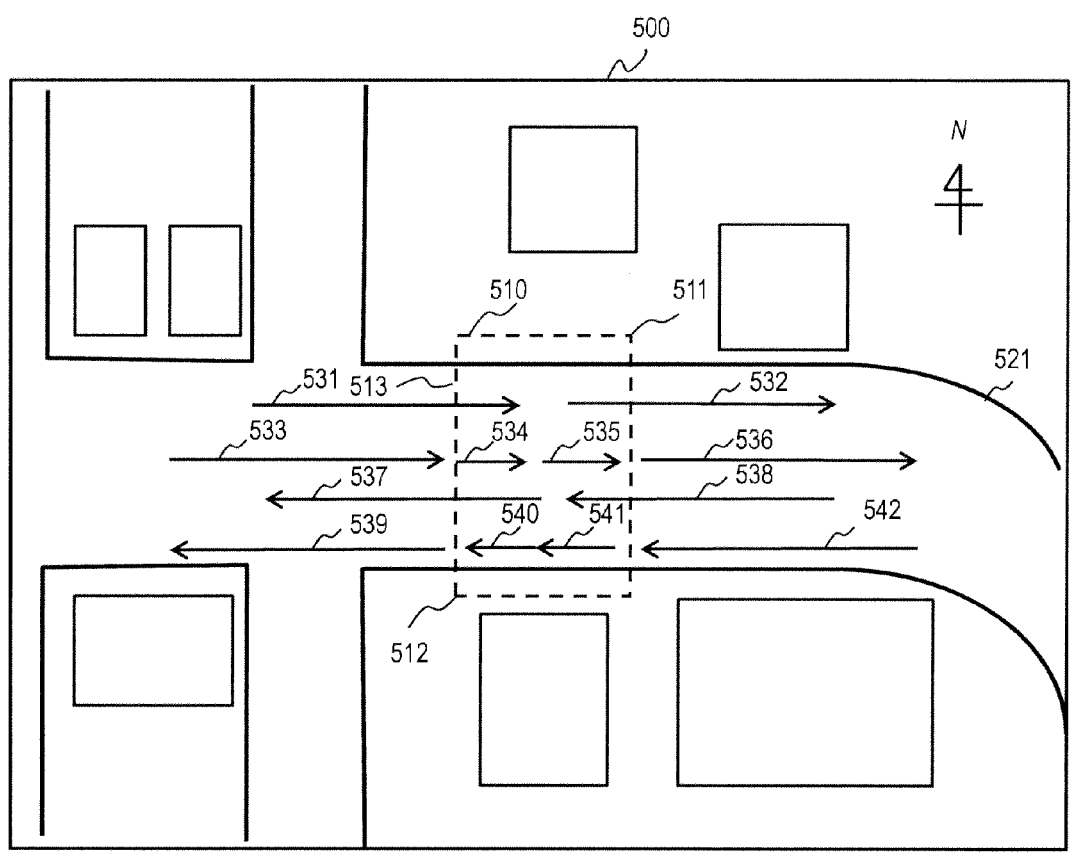
FIG. 5 illustrates a map of an area in map data and tracks which can be included in test cases for a function to be tested in the embodiment.

FIG. 5 illustrates a map of an area 500 in the map data 109 and tracks which may be included in test cases for this function. In FIG. 5, the top of the sheet represents the true north. The area shown in the map of FIG. 5 includes a sharp curve 521 and an area 510 specified by the event generation requirements table 107. The area 510 is specified with the latitude and longitude of the northeast corner 511 and the latitude and longitude of the southwest corner 512. The timing of checking the event generation requirements in the event generation requirements table 107 is when the vehicle enters the area 510 from its west end 513.

In FIG. 5, the arrows (tracks) 531 to 542 on the road represent different tracks. Each of the tracks 531 to 542 is defined by a start point, an end point, and a driving direction. In FIG. 5, the tracks 531 to 542 are disposed at four different positions in the north and south direction to show the tracks, but all the tracks in test data are located at the same position (same latitude) in the north and south direction. The tracks 531 to 536 are in the direction toward the curve 521 and the tracks 537 to 542 are in the direction away from the curve 521.

The area items specified by the event generation requirements table 107 specifies that the event generation requirements are checked when the vehicle enters the area 510 from the west boundary 513 of the area 510. Among the tracks 531 to 542 in FIG. 5, the track 531 meets the requirements. Whether a track satisfies these requirements can be determined from the start point, the end point, and the driving direction of the track.

The tracks 532 to 542 do not satisfy the requirement on the direction. As to the track 532, the start point is in the area 510; it does not satisfy the requirement on the entering the area. As to the tracks 533 and 536, the start points and the end points are outside the area 510; they do not satisfy the requirement on the entering the area. As to the tracks 534 and 535, the start points and the end points are in the area 510; they do not satisfy the requirement on the entering the area.

In other words, tracks starting from the outside of the area 510, crossing the west boundary 513, and heading toward the east satisfy the requirements on the area items specified by the event generation requirements table 107. In the example of FIG. 5, only the track 531 corresponds to the track matching the requirements.

The timing of checking may be specified as the time of entering the area 510; in this case, determination whether to match the event generation requirements is made on tracks entering the area 510 from any boundary if the track meets the requirement on the direction (within 70 to 110 degrees in this example).

The test policy table 108 specifies policies of the test, namely, policies in creating test cases. The policies enable selection of test cases necessary for proper testing from the test cases of all possible circumstances, achieving proper and efficient testing without testing all the test cases.

FIG. 4 illustrates a configuration example of the test policy table 108, which specifies the test policies for the function of alarming the driver, as the event generation requirements table 107 in FIG. 3 does. The test policy table 108 is user-configurable; the user (developer) configures the test policy table 108 to define the test policies as intended. The test policy table 108 has a category column 401, an item column 402, and a policy column 403.

The category column 401 stores categories for categorizing the items (values in the item column 402) of the test policies. This example has three categories: "area", "vehicle", and "GPS" (Global Positioning System). The categories of "area" and "vehicle" respectively correspond to the categories of "area" and "vehicle" in the event generation requirements table 107.

These categories include policy items concerning the area specified by the event generation requirements table 107 to create test cases, policy items concerning the behavior of the vehicle specified by the event generation requirements table 107 to create test cases, and policy items concerning the GPS operation to create test cases. The item column 402 stores the items of the test policies belonging to each category. The policy column 403 indicates the test policy on each item in the item column 402.

In this example, the category "area" in the category column 401 includes items of "tracks matching event generation requirements" and "tracks mismatching event generation requirements" in the item column 402. In the example shown in FIG. 5, the track 531 matches the event generation requirements and the other tracks mismatch the event generation requirements.

As to the item "tracks matching event generation requirements", the policy column 403 specifies a policy of conducting the testing of the test cases for all the tracks. This means to create test cases for all the tracks matching the event generation requirements. Furthermore, as to the item "tracks mismatching event generation requirements", the policy column 403 specifies a policy of conducting the testing of the test cases for the tracks heading in the direction meeting the event generation requirements. In the example of FIG. 5, the direction meeting the event generation requirements is the east; the tracks 531 to 536 are heading in this direction. Among the tracks mismatching the event generation requirements, test cases are created for the tracks 532 to 536.

The category "vehicle" in the category column 401 includes items of "speed", "acceleration", and "direction" in the item column 402, which respectively correspond to the items of "speed", "acceleration", and "direction" in the event generation requirements table 107.

As to the item "speed", the policy column 403 specifies a policy of creating test cases at the default value (the legal speed limit included in the map data 109) and two limit values of the upper limit value (150 km/h) and the lower limit value (1 km/h). As to the item "acceleration", the policy column 403 specifies a policy of creating test cases at the default value (0 m/s^2) and the upper limit value (8 m/s^2). As to the item "direction", the policy column 403 specifies a policy of creating test cases at the default value (the intermediate value of the event generation requirements).

The category "GPS" in the category column 401 includes the items of "acquisition cycle" and "acquisition timing" in the item column 402. As to the item "acquisition cycle", the policy column 403 specifies a policy of creating test cases in which the car navigation program acquires positional information every one second. Furthermore, the policy column 403 specifies a policy of creating test cases in which the "acquisition timing" is shifted by 1/3 of the value of the acquisition cycle (1/3 seconds in this example).

This example creates test cases of all the patterns, namely, all the combinations of the conditional values, specified by the policies under the categories "vehicle" and "GPS" for the tracks selected in accordance with the policies under the category "area". Specifically, this example creates test cases of all the combinations of values different in vehicle speed, vehicle acceleration, and GPS acquisition timing specified in the policy column 403 for each selected track. The values for the vehicle direction and the acquisition timing are common to all the test cases.

If too many test cases are to be created, the test policy table 108 may specify another policy of selecting part of the test cases that can be created for a selected track. For example, if a policy on an item includes a plurality of values inclusive of a default value, creating test cases for a track mismatching the event generation requirements may select only the default value for the item. For example, test cases for the acceleration at the upper limit value are not created for the tracks mismatching the event generation requirements. This approach reduces the number of test cases as appropriate to the event generation requirements.

The test policies depend on the function to be tested. For example, policies may be specified only for the area in the table 108 of FIG. 4, only for the area and the vehicle, or only on a part of the items in each category. Policies in other categories or on other items may be specified.

Figure 6:
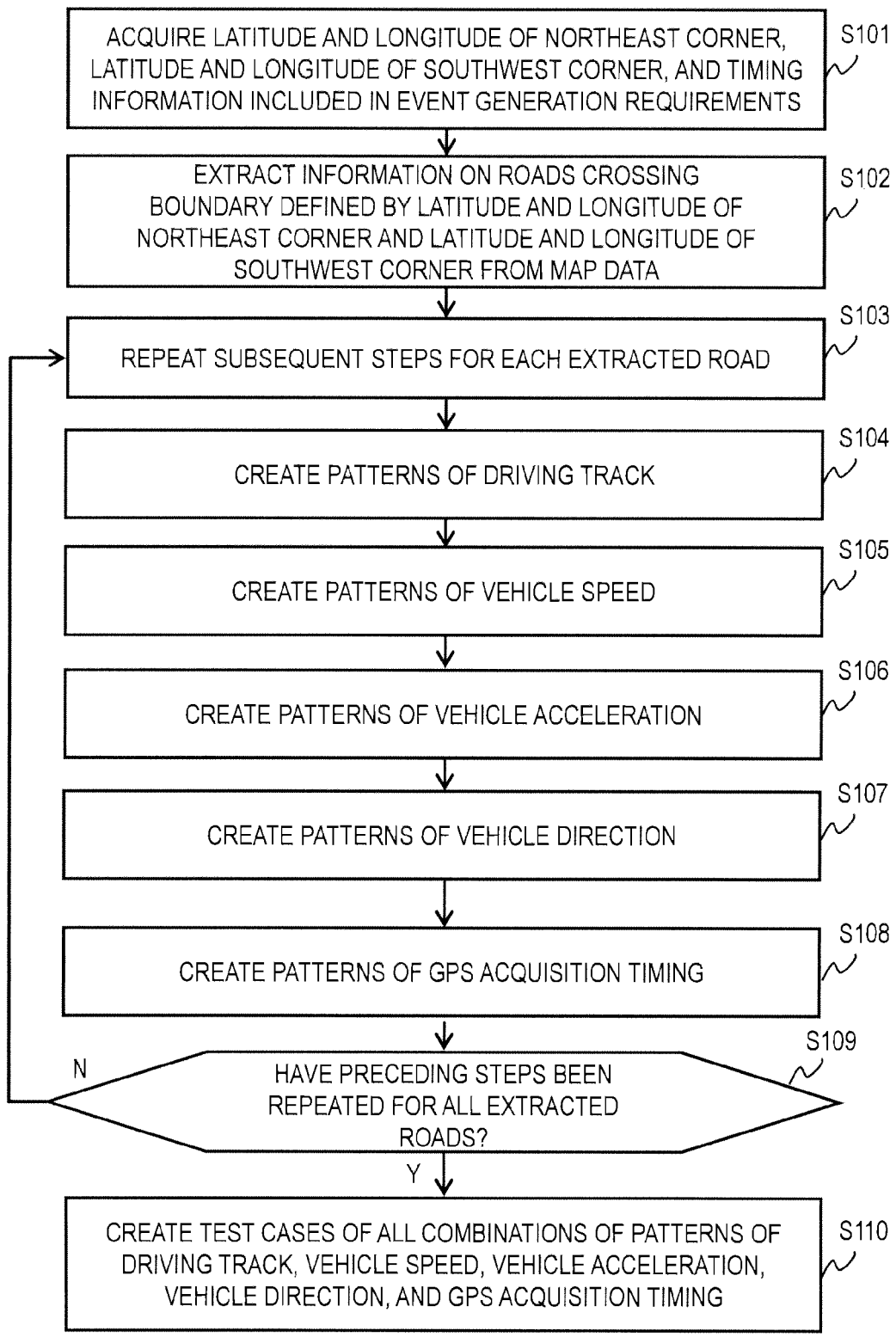
FIG. 6 is a flowchart of an example of creating test cases by a test case creation program in the embodiment.
Figure 7A:
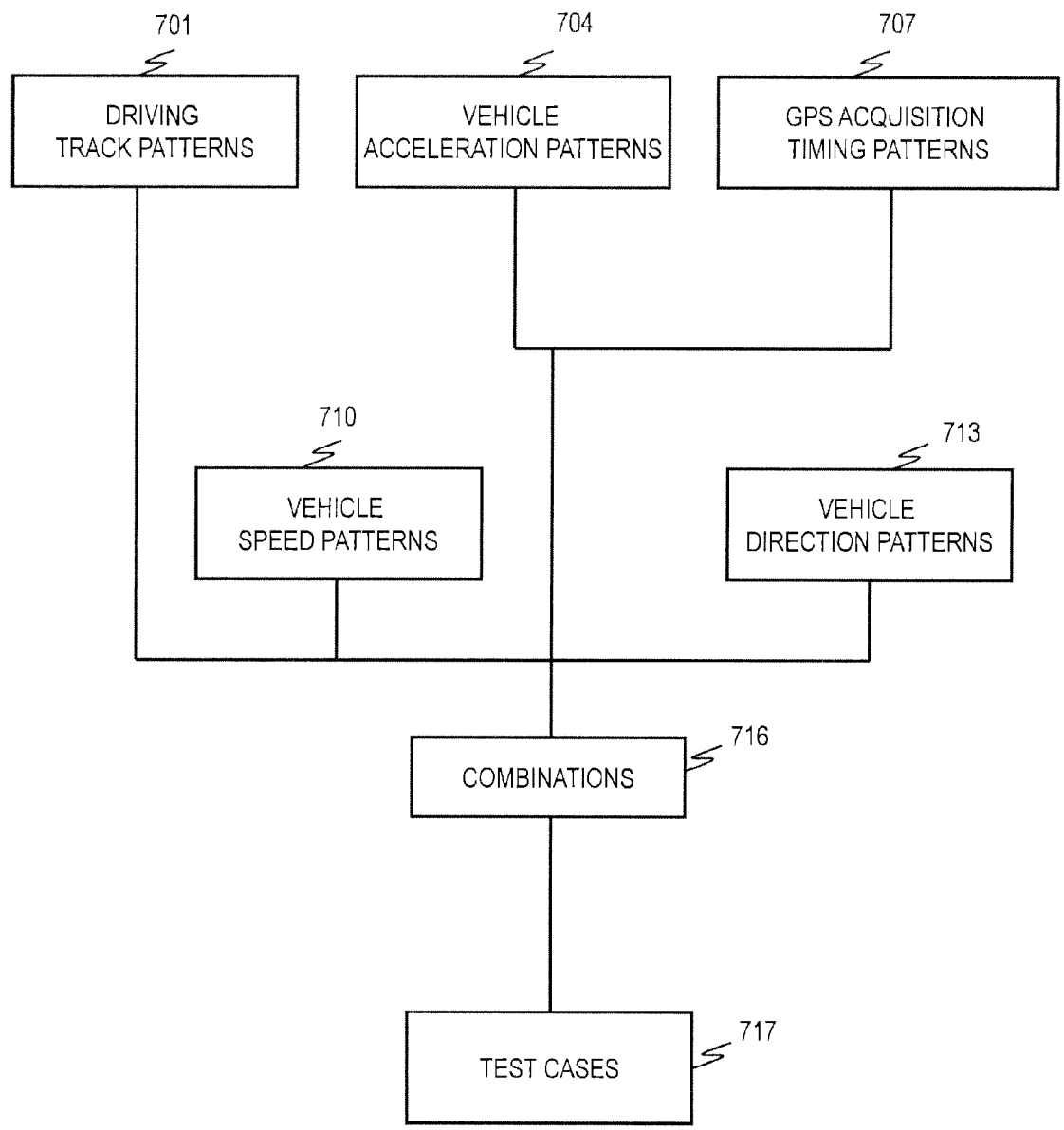
FIG. 7A illustrates data flow in the process flow shown in FIG. 6.

FIG. 6 is a flowchart of creating test cases by the test case creation program 105. FIG. 7A illustrates a data flow in the process flow shown in FIG. 6. The test case creation program 105 refers to the test policy table 108, the event generation requirements table 107, and the map data 109 to create test cases from the information.

In the flowchart of FIG. 6, the test case creation program 105 acquires values in the value column 303 of the entries of the "latitude and longitude of northeast corner", the "latitude and longitude of southwest corner", and the "timing" in the category of "area" included in the event generation requirements table 107 (S101).

Next, the test case creation program 105 defines a rectangle having vertexes at the acquired values of the latitude and longitude of northeast corner and the latitude and longitude of southwest in the map data 109. This rectangle is the area for creating test cases (the area 510 in FIG. 5). Furthermore, the test case creation program 105 defines the sides of the rectangle as the boundary of the area and extracts information on the roads crossing the boundary from the map data 109 (S102). In the example of FIG. 5, only one road is crossing the boundary of the area 510.

The test case creation program 105 creates, for each extracted road (S103), patterns of driving tracks 701 (S104), patterns of vehicle speeds 710 (S105), patterns of vehicle accelerations 704 (S106), patterns of vehicle directions 713 (S107), and patterns of GPS acquisition timings 707 (S108). The test case creation program 105 checks whether the steps S104 to S108 have been repeated for all the extracted roads (S109).

If the steps S104 to S108 have not been repeated for all the roads (N at S109), the test case creation program 105 returns to step S103. If the steps S104 to S108 have been repeated for all the roads (Y at S109), the test case creation program 105 creates all combinations 716 of patterns selected one each from the created patterns of driving tracks 701, patterns of vehicle speeds 710, patterns of vehicle accelerations 704, patterns of vehicle directions 713, and patterns of GPS acquisition timings 707 to create test cases 717 of all of the combinations 716 (S110).

FIG. 7B is a diagram illustrating examples of the driving track patterns 701 created at the driving track pattern creation step S104. These examples correspond to the plurality of driving track patterns in the example FIG. 5. FIG. 7B illustrates the driving track patterns 701 in a table, which has a driving track column 702 and a column 703 of match/mismatch with event generation requirements.

The driving track column 702 stores identifiers of driving tracks. The column 703 of match/mismatch with event generation requirements stores values indicating whether the individual driving tracks match the requirement on the driving track in the event generation requirements. As previously described, each track can be defined by its start point, end point, and direction; the created driving track patterns 701 can indicate each track with these values.

In FIG. 7B, the identifiers of the driving tracks correspond to the reference numerals assigned to the driving tracks in FIG. 5. As described, the track 531 satisfies the event generation requirements and the other tracks do not satisfy the event generation requirements. In accordance with the policies on the area in the test policy table 108, the test case creation program 105 creates all tracks (patterns) matching the event generation requirements and tracks (patterns) having the direction of event generation requirement out of the tracks mismatching the event generation requirements.

Specifically, the test case creation program 105 creates the following six tracks having the direction of event generation requirement: (1) a track crossing the boundary from the outside of the designated area 510, (2) a track crossing the boundary from the inside of the designated area 510, (3) a track ending immediately before the area boundary (a track to a proximity of the boundary) outside the designated area 510, (4) a track which starts from a proximity of the area boundary inside the designated area 510 and does not cross the boundary, (5) a track starting from a point inside the designated area 510 and ending immediately before the area boundary (ending at a proximity of the area boundary), and (6) a track starting from a proximity of the area boundary outside of the designated area 510. The proximity of the area boundary means points within a predetermined distance from the boundary.

In FIG. 5, the tracks 531, 532, 533, 534, 535, and 536 correspond to the above-described six tracks. In the example of FIG. 5, the area 510 includes only one road; however, the area may be defined to include a plurality of roads. The road may be a one-way road; in such a case, the pattern extraction extracts tracks having the permitted direction. The test case creation program 105 may follow other rules to create the patterns.

FIG. 7C is a diagram illustrating examples of the vehicle speed patterns 710 created at the vehicle speed pattern creation step S105. FIG. 7C illustrates the vehicle speed patterns 710 in a table, which has a vehicle speed column 711 and a column 712 of match/mismatch with event generation requirements. The vehicle speed column 711 stores created values (patterns) of vehicle speed and the column 712 of match/mismatch with event generation requirements stores values indicating whether the individual values of vehicle speed match the requirement on the vehicle speed in the event generation requirements.

The test case creation program 105 determines values of the vehicle speed to be included in the test cases (vehicle speed patterns 710) in accordance with the event generation requirements and test policies. In this example, if the event generation requirements include requirements on the vehicle speed, the test case creation program 105 creates the following patterns: (1) a pattern of a speed specified by the requirements; (2) a pattern of a speed at the speed specified by the requirements −1 km/h; and (3) a pattern of a speed at the speed specified by the requirements +1 km/h. This example subtracts 1 from or adds 1 to the speed specified by the requirements, but this predetermined value depends on the design and is not limited to 1. The value to be added may be different from the value to be subtracted.

In addition, if the test policies specify a default value for the speed, the test case creation program 105 creates (4) a pattern of a speed at the default value. If the test policies still further specify a limit value, the program 105 creates (5) a pattern of a speed at the lower limit value and (6) a pattern of a speed at the upper limit value. In this way, the rules followed by the test case creation program 105 are included in the user-configurable test policies or specified in the test case creation program 105 in advance. The rule and the method to specify the rule depend on the design. The same applies to creating the other patterns.

The example of the event generation requirements table 107 shown in FIG. 3 specifies a requirement that the vehicle speed should be 60 km/h or more. Accordingly, the test case creation program 105 includes 60 km/h, (60−1) km/h, and (60+1) km/h in the vehicle speed patterns 710.

The example of the test policy table 108 shown in FIG. 4 specifies a default value and limit values for the vehicle speed. It specifies the default value of the speed limit, the lower limit value of 1 km/h, and the upper limit value of 150 km/h. Accordingly, the test case creation program 105 includes the speed limit for the road, 1 km/h, and 150 km/h in the vehicle speed patterns 710.

In this way, this example includes six values (patterns) for the vehicle speed in the vehicle speed patterns 710. The table of the vehicle speed patterns 710 in FIG. 7C lists these six values (patterns) for the vehicle speed. If any two of the created patterns have the same value, one of them may be selected.

The test case creation program 105 may follow other rules to create patterns. For example, if the event generation requirements do not include requirements on the speed, the test case creation program 105 may create only a pattern at the default value specified by the test policies. If the event generation requirements include requirements on the speed, the test case creation program 105 does not need to create the pattern at the default value. The same applies to creating the other kinds of patterns.

FIG. 7D is a diagram illustrating examples of the vehicle acceleration patterns 704 created at the vehicle acceleration pattern creation step S106. FIG. 7D illustrates the vehicle acceleration patterns 704 in a table, which has a vehicle acceleration column 705 and a column 706 of match/mismatch with event generation requirements. The vehicle acceleration column 705 stores created values (patterns) of vehicle acceleration and the column 706 of match/mismatch with event generation requirements stores values indicating whether the individual values of vehicle acceleration match the requirement on the vehicle acceleration in the event generation requirements.

The test case creation program 105 determines values of the vehicle acceleration to be included in the test cases (vehicle acceleration patterns 704) in accordance with the event generation requirements and test policies. In this example, if the event generation requirements include requirements on the vehicle acceleration, the test case creation program 105 creates the following patterns: (1) a pattern of an acceleration specified by the requirements; (2) a pattern of an acceleration specified by the requirements −1 m/s^2; and (3) a pattern of an acceleration specified by the requirements +1 m/s^2. This example subtracts 1 from or adds 1 to the acceleration specified by the requirements, but this predetermined value depends on the design and is not limited to 1. The value to be added may be different from the value to be subtracted.

In addition, if the test policies specify a limit value, the test case creation program 105 creates (4) a pattern of an acceleration at the lower limit value, and (5) a pattern of an acceleration at the upper limit value. If the test policies still further specify a default value, the test case creation program 105 creates (6) a pattern of an acceleration at the default value.

The example of the event generation requirements table 107 in FIG. 3 does not specify a requirement on the acceleration. The example of the test policy table 108 in FIG. 4 specifies a default value and a limit value for the acceleration. Accordingly, the test case creation program 105 creates patterns of these two values. As shown in the example of FIG. 7D, the vehicle acceleration patterns 704 consist of a pattern at the default value of 0 m/s^2 and a pattern at the limit value of 8 m/s^2. Since the event generation requirements do not specify the acceleration, any pattern matches the event generation requirements.

FIG. 7E is a diagram illustrating examples of the vehicle direction patterns 713 created at the vehicle direction pattern creation step S107. FIG. 7E illustrates the vehicle direction patterns 713 in a table, which has a vehicle direction column 714 and a column 715 of match/mismatch with event generation requirements. The vehicle direction column 714 stores created values (patterns) of vehicle direction and the column 715 of match/mismatch with event generation requirements stores values indicating whether the individual values of vehicle direction match the requirement on the vehicle direction in the event generation requirements.

The test case creation program 105 determines values of the vehicle direction to be included in the test cases (vehicle direction patterns 713) in accordance with the event generation requirements and test policies. In this example, if the event generation requirements include requirements on the vehicle direction, the test case creation program 105 creates the following patterns: (1) a pattern of an angle at the middle of the smallest angle (minimum angle) and the largest angle (maximum angle) specified by the requirements; (2) a pattern of an angle at the smallest angle specified by the requirements; (3) a pattern of an angle at the largest angle specified by the requirements; (4) a pattern of an angle at the smallest angle specified by the requirements −1 degree; and (5) a pattern of an angle at the largest angle specified by the requirements +1 degree.

This example subtracts 1 degree from the minimum angle specified by the requirements and adds 1 degree to the maximum angle specified by the requirements, but these predetermined values depend on the design and are not limited to 1. The value to be added may be different from the value to be subtracted.

In addition, if the test policies specifies a limit value for the vehicle direction, the test case creation program 105 creates (6) a pattern of an angle at the lower limit value, and (7) a pattern of an angle at the upper limit value. If the test policies still further specifies a default value for the vehicle direction, the test case creation program 105 creates (8) a pattern at the default value.

The example of the event generation requirements table 107 in FIG. 3 specifies an angular range for the vehicle direction. Accordingly, the test case creation program 105 creates the foregoing five patterns from the values of the angular range.

The example of the test policy table 108 in FIG. 4 specifies a default value for the vehicle direction. Accordingly, the test case creation program 105 creates a pattern at the default value. In this example, however, since the default value is the same as the middle value of the angular range in the event generation requirements, the pattern at the default value is not necessary.

As shown in the example of FIG. 7E, the vehicle direction patterns 713 consist of a pattern at the middle value of the angular range specified by the event generation requirements of 90 degrees, a pattern at the smallest value of 70 degrees, a pattern at the largest value of 110 degrees, a pattern at one degree smaller than 70 degrees of 69 degrees, and a pattern at one degree larger than 110 degrees of 111 degrees.

FIG. 7F is a diagram illustrating examples of the GPS acquisition timing patterns 707 created at the GPS acquisition timing pattern creation step S108. FIG. 7F illustrates the GPS acquisition timing patterns 707 in a table, which has a GPS acquisition timing column 708 and a column 709 of match/mismatch with event generation requirements. The GPS acquisition timing column 708 stores created values (patterns) of GPS acquisition timing and the column 709 of match/mismatch with event generation requirements stores values indicating whether the individual values of GPS acquisition timing match the requirement on the GPS acquisition timing in the event generation requirements.

The test case creation program 105 determines values of the GPS acquisition timing to be included in the test cases (GPS acquisition timing patterns 707) in accordance with the event generation requirements and test policies. The example of the test policy table 108 shown in FIG. 4 specifies the GPS acquisition cycle as one second and that the GPS acquisition timing is to be shifted by one third of the acquisition cycle.

The test case creation program 105 creates three patterns in which the start of the acquisition cycle is shifted by 1/3 seconds with reference to the start of the testing. The examples of the GPS acquisition timing patterns 707 in FIG. 7 consist of a pattern starting the acquisition at 0 seconds after the start of the testing, a pattern starting the acquisition at 1/3 seconds after the start of the testing, and a pattern starting the acquisition at 2/3 seconds after the start of the testing. In the case of specification of "shift by acquisition cycle/n" (n is an integer equal to or more than one), the GPS acquisition timing patterns 707 consist of n patterns in which the start times of acquisition are different by cycle/n from the start time of the testing from one another.

The method of creating different timings of acquiring positional information is not limited to the foregoing example but depends on the design of the test support system. In the foregoing example, the amount to be shifted is uniform, but it may be various. The amount to be shifted may be independent from the acquisition cycle. The start of the testing does not need to be synchronous with the acquisition timing.

The above-described methods of creating the patterns of the items are merely examples and they are not limited to these. In the case where one value is specified by the event generation requirements, the test case creation program 105 can create all or a part of the patterns at the value and proximate values thereof. In the case where a numerical range is specified by the event generation requirements, the test case creation program 105 can create all or a part of the patterns of the limit values, proximate values of the limit values, and the middle value of the limit values. The same applies to the policies.

FIG. 7G is a diagram illustrating test cases created by the test case creation program 105 from the patterns in FIGS. 7B to 7F and shows part of all the test cases. Each entry corresponds to one test case.

The table of FIG. 7G has a driving track column 718, a vehicle speed column 719, a vehicle acceleration column 720, a vehicle direction column 721, a GPS acquisition timing column 722, and a column 723 of match/mismatch with event generation requirements. The column 723 of match/mismatch with event generation requirements stores, in each entry, a value indicating mismatch if any value of the patterns in the combination of the entry does not match the event generation requirements.

As previously described, the test case creation program 105 selects one pattern each from the created driving track patterns 701, vehicle speed patterns 710, vehicle acceleration patterns 704, vehicle direction patterns 713, and GPS acquisition timing patterns 707 to create a test case. In FIG. 7G, the patterns of the elements in each test case are the six patterns of the foregoing six items. The combinations of patterns are different in all test cases and test cases are created for all combinations of the six patterns of the six items.

Figure 8:
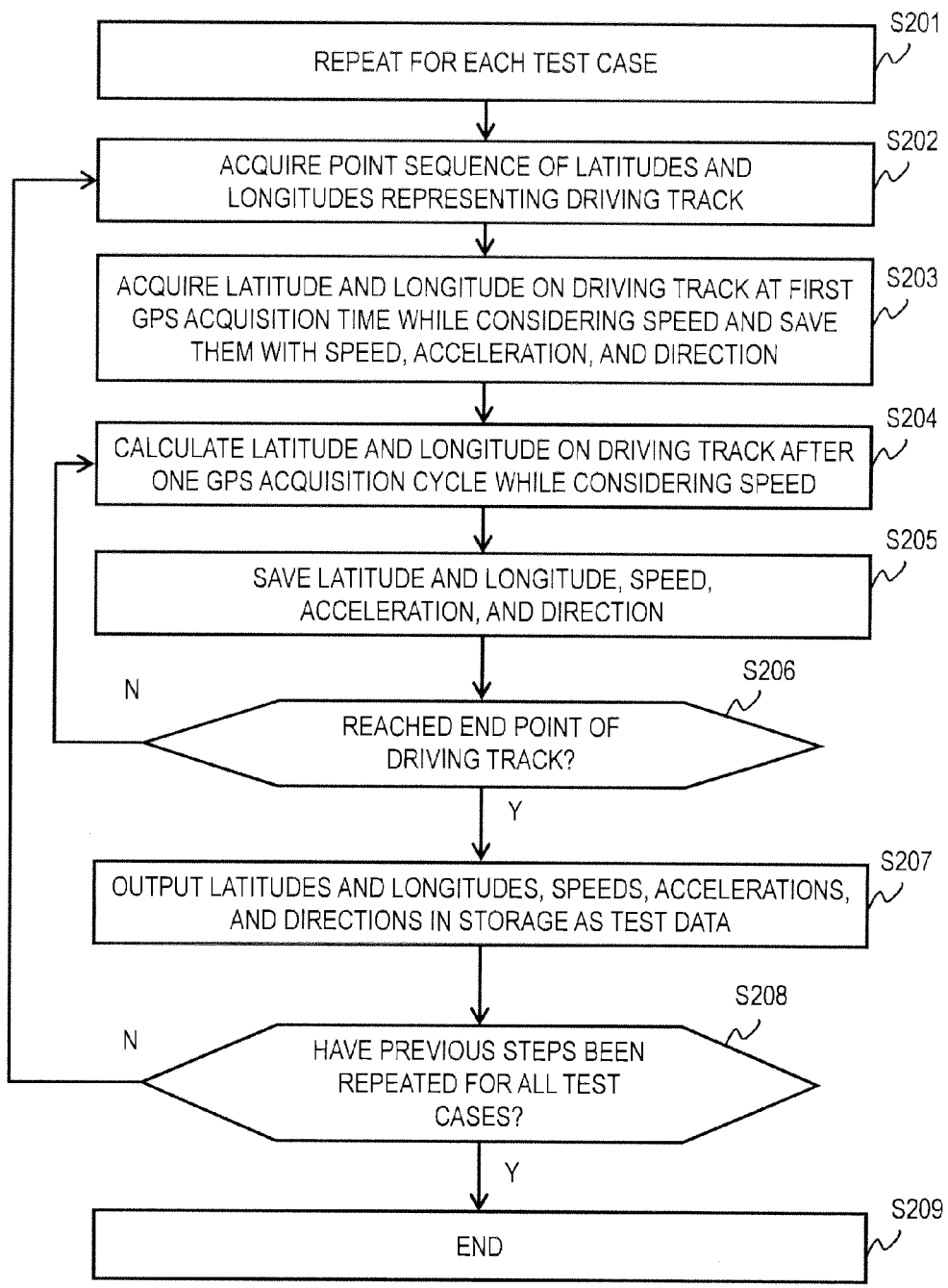
FIG. 8 is a flowchart illustrating an example of processing of the test data creation program in the embodiment.

The test data creation program 106 creates test data from the created test cases 717. FIG. 8 is a flowchart illustrating an example of processing of the test data creation program 106.

In the flowchart of FIG. 8, the test data creation program 106 repeats the subsequent steps for each test case (S201). At step S202, the test data creation program 106 acquires a point sequence of the longitudes and latitudes corresponding to the driving track in the test case.

Next, the test data creation program 106 acquires the longitude and latitude on the driving track at the first GPS acquisition time in consideration of the vehicle speed and saves them together with the vehicle speed, the vehicle acceleration, and the vehicle direction (S203). The test data creation program 106 calculates the longitude and latitude on the driving track after one GPS acquisition cycle in consideration of the vehicle speed (S204). Furthermore, the test data creation program 106 saves the latitude and longitude, the vehicle speed, the vehicle acceleration, and the vehicle direction (S205).

The test data creation program 106 checks whether the calculation of the latitude and longitude has reached the end point of the driving track (S206). If it has not reached it yet (N at S206), the test data creation program 106 repeats the step S204 and the subsequent steps. If it has reached it (Y at S206), the test data creation program 106 outputs the combinations of longitude and latitude, vehicle speed, vehicle acceleration, and vehicle direction held in the storage as test data (S207).

The test data creation program 106 checks whether the steps S203 to S207 have been repeated for all the test cases (S208). If they have not been repeated yet (N at S208), the test data creation program 106 repeats the step S202 and the subsequent steps. If they have been repeated for all the test cases (Y at S208), the test data creation program 106 exits this flow (S209).

It should be noted that the combination of values at each position in test data depends on the program. In the above example, test data is composed of a plurality of combinations of values of position, speed, acceleration, and direction, but combinations in test data created by a different program may be combinations of values of position and a part of the other elements.

Figure 9:
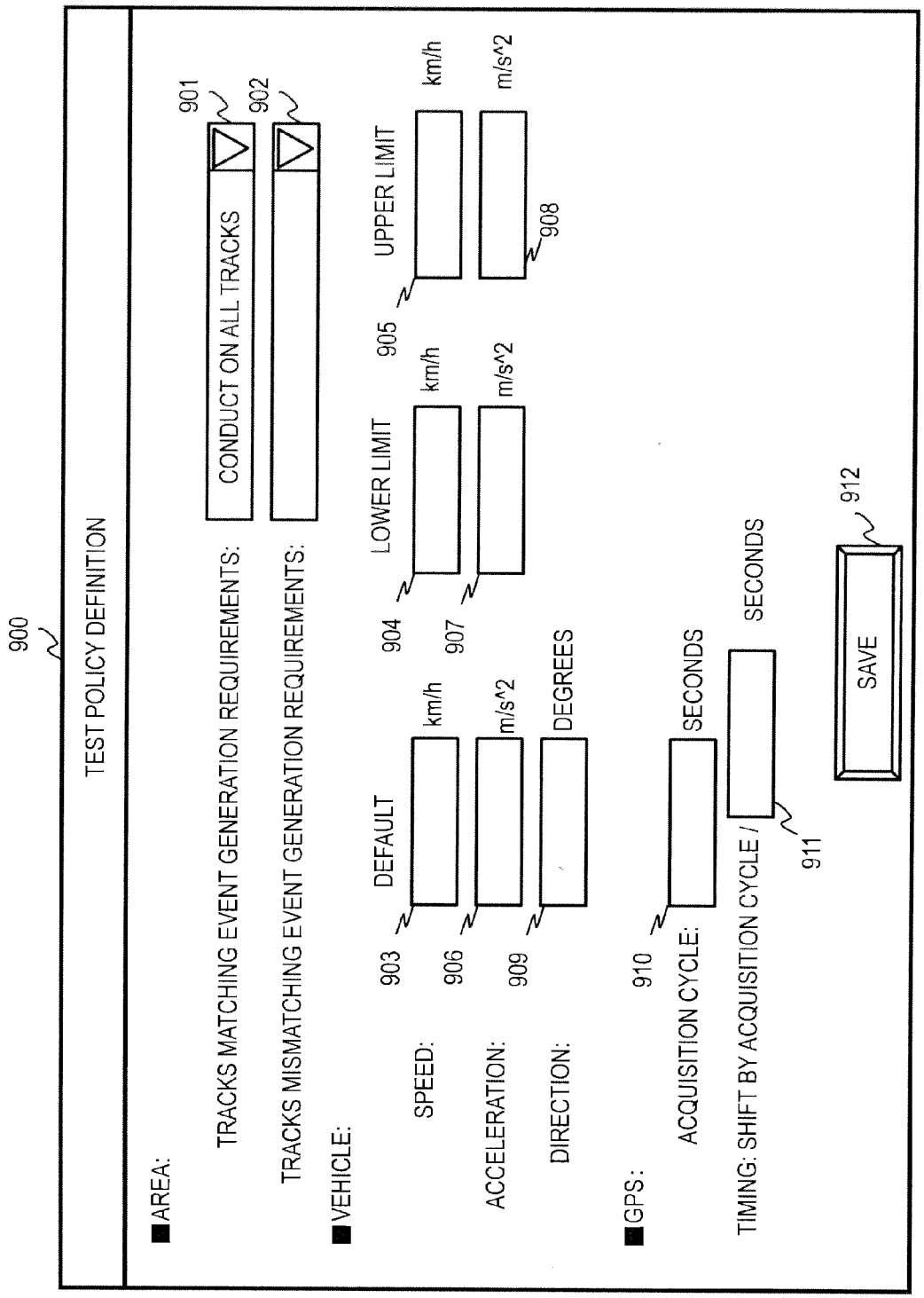
FIG. 9 illustrates an example of a GUI image for a user to define the test policies in the embodiment.

FIG. 9 illustrates an example of a GUI image 900 for the user to define test policies. This GUI is presented on the output device 103 by a GUI program (not shown) included in the test support program; the user enters necessary information with the input device 104. The GUI program registers the received definition information in the test policy table 108.

The field 901 of "tracks matching event generation requirements" is to enter a policy on the "tracks matching event generation requirements" in the test policy table 108. The field 902 of "tracks mismatching event generation requirements" is to enter a policy on the "tracks mismatching event generation requirements" in the test policy table 108. For example, the user can select a policy on these tracks from a pull-down menu.

The user can assign the values about the speed of the vehicle in the field 903 of "default", the field 904 of "lower limit", and the field 905 of "upper limit". As to the acceleration of the vehicle, the user can similarly assign the values in the field 906 of "default", the field 907 of "lower limit", and the field 908 of "upper limit". As to the direction of the vehicle, the user can assign the value in the field 909 of "default".

The value assigned in the field 910 of "acquisition cycle" concerning the GPS indicates how often to receive a GPS signal. The value assigned in the field 911 of "timing" indicates how long to shift the acquisition timing to conduct the testing. For example, the user specifies the acquisition cycle as one second and that the timing is to be shifted by an acquisition cycle/3, namely 1/3 seconds.

In this example, the test case creation program 105 creates three cases: a case starting GPS acquisition 0/3 seconds after the start of the testing and repeating it every one second, a case starting GPS acquisition 1/3 seconds after the start of the testing and repeating it every one second, and a case starting GPS acquisition 2/3 seconds after the start of the testing and repeating it every one second. Upon completion of definition, the user presses the save button 912; in response, the GUI program updates the policy table 108 with the assigned values and save it.

The image 900 for defining test policies shown in FIG. 9 is merely an example and the elements that can be specified depend on the design of the test support system. Another example may provide a GUI that allows elements which are a part of the elements shown in FIG. 9 or different from the elements shown in FIG. 9 to be specified. The method of displaying the elements depends on the design of the GUI and is not limited to the example of FIG. 9.

Figure 10:
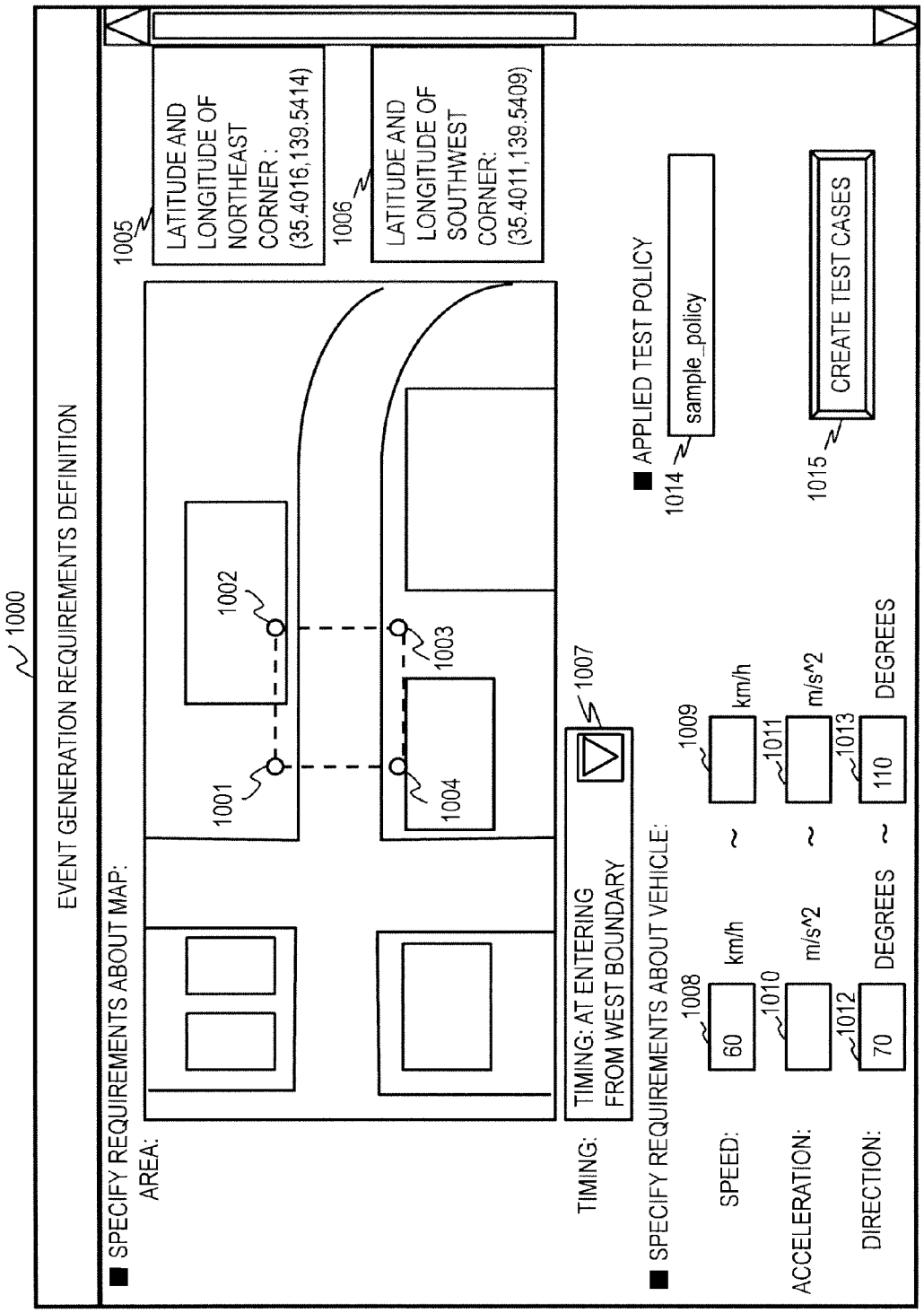
FIG. 10 illustrates an example of a GUI image to define the event generation requirements.

FIG. 10 illustrates an example of a GUI image 1000 to define event generation requirements. The user drags the handles 1001, 1002, 1003, and 1004 of an area on the map image with a mouse (input device 103) to define the area to generate the event. The user changes this area to change the values of the latitude and longitude of the northeast corner 1005 and the latitude and longitude of the southwest corner 1006.

The user can specify the timing of checking the event generation requirements in the field 1007 of "timing". For example, the timing may be at entering or exiting the area. The timing at entering the area means that, when the vehicle first enters the area from the outside of the area, the event generation requirements are checked (the event is generated) and the timing at exiting the area means that when the vehicle first exits the area to the outside of the area, the event generation requirements are checked (the event is generated).

The fields 1008 and 1009 of "speed" indicate the range of the vehicle speed to generate the event. The fields 1010 and 1011 of "acceleration" indicate the range of the vehicle acceleration to generate the event. The fields 1012 and 1013 of "direction" indicate the range of the vehicle direction to generate the event. The user assigns the name, such as the file name, of the test policies, in the field 1014 of "applied test policies".

The GUI program updates the event generation requirements table 107 with the entered data on the event generation requirements. Upon completion of the above-described definition, the user presses the "create test cases" button 1015 to start creating test cases.

The image 1000 for defining event generation requirements shown in FIG. 10 is merely an example and the elements that can be specified depend on the design of the test support system. Another example may provide a GUI that allows elements which are a part of the elements shown in FIG. 10 or different from the elements shown in FIG. 10 to be specified. The method of displaying the elements depends on the design of the GUI and it is not limited to the example of FIG. 10.

Figure 11:
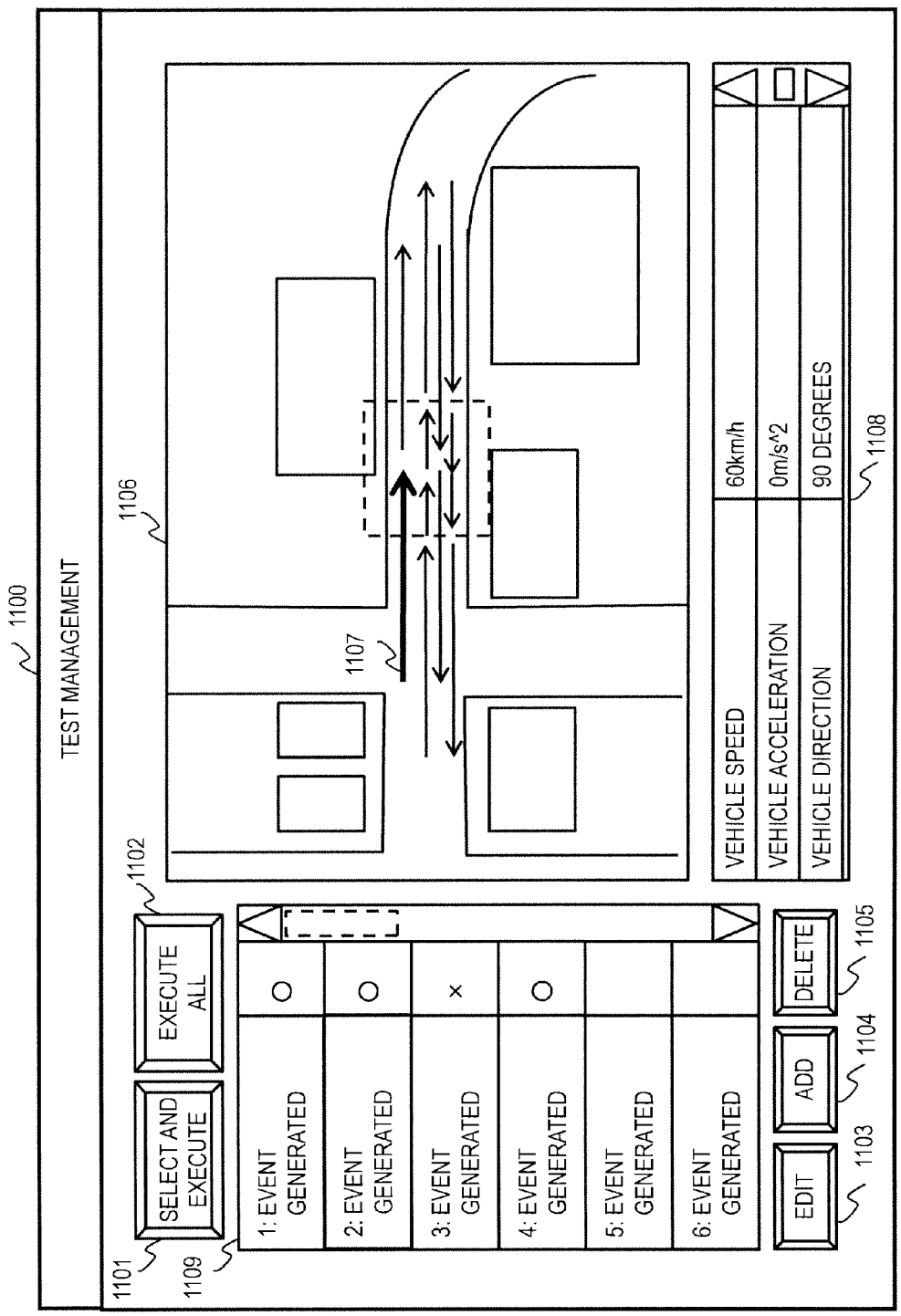
FIG. 11 illustrates an example of a test management image in the embodiment.

FIG. 11 illustrates an example of a test management image 1100. The test management image 1100 is for the user to check automatically created test cases, edit the created test cases, or execute testing. The GUI program displays this image on the output device 103.

The user can execute testing of a program by connecting a mobile object in which the function actually works, such as a mobile phone or a car navigation terminal, to the computer 100 and sending test data to the mobile object. Alternatively, the user may install an emulator for emulating the software function that works in the mobile object into the computer 100 to execute the testing using the emulator.

The left side of the test management image 1100 is a test case list display section 1109. The left side of the test case list display section 1109 displays test case numbers and whether or not to generate the event. The marks "o" and "x" on the right side of the test case list display section 1109 show the results of the testing.

The mark "o" means that the function worked properly (the testing was successful) and the mark "x" means that the function worked improperly (the testing was failed). For example, when the test is conducted under the conditions meeting the event generation requirements and if the event is actually generated, the entry indicates "o". If the event is not generated, it means that the function does not work as required by the software; accordingly, the entry indicates "x".

The "select and execute" button 1101 is a button to execute the test cases selected in the list in the test case list display section 1109. The "execute all" button 1102 is a button to execute all the tests defined as test cases in a batch. The "edit" button 1103 is a button to edit the details of an existing test case; the "add" button 1104 is a button to newly add a test case; the "delete" button 1105 is a button to delete an existing test case.

The right side of the test management image 1100 is a map display section 1106. The section 1106 displays driving tracks specified in the test cases on the map. These driving tracks are linked with the test case list.

Specifically, when the user selects any one of the test cases in the test case list display section 1109 with the input device 104, the map display section 1106 (GUI program) highlights a driving track 1107 corresponding to the test case. Conversely, when the user selects a driving track in the map display section 1106 with the input device 104, the test case list display section 1109 (GUI program) highlights one or more test cases corresponding to the driving track or displays only the one or more test cases.

The lower right part of the test management image 1100 is a parameter display section 1108 to display parameters on the vehicle and the GPS in the test case selected in the test case list display section 1109.

The test management image 1100 shown in FIG. 11 is merely an example and the elements that can be checked depend on the design of the test support system. Another example may provide a GUI that allows elements which are a part of the elements shown in FIG. 11 or different from the elements shown in FIG. 11 to be checked. The method of displaying the elements depends on the design of the GUI and it is not limited to the example of FIG. 11.

Other Embodiments

In the test policy table 108, the policies under the category "area" can be specified as a combination of one or more elements selected from the group of (1) conduct on the tracks in the direction of event generation requirement, (2) conduct on the tracks in the opposite direction to the event generation requirement, (3) conduct on the tracks outside the area, and (4) conduct on the tracks inside the area, other than the example shown in FIG. 4. For example, a policy can be defined to generate test cases only for the tracks "in the direction of event generation requirement" and "outside the area" ((1) and (3)).

As described above, the test support method in the embodiments creates test cases using information included in the map data 109. The foregoing example uses information on the position and the shape (such as a curve or a straight line) of a road and further uses information on the speed limit and the permitted traffic direction (whether the road is a one-way road or a two-way road) according to the road traffic regulations.

The map data 109 includes various kinds of information on the road in addition to the aforementioned information. The test support system can use the various kinds of information included in the map data 109 to determine test cases to be created. For example, the map data 109 includes information on the type of road (such as highway, ordinary road, or expressway), the width of the road/the number of traffic lanes, the time regulation (for example, school zones in the morning and afternoon, road closure during specified hours, and lane shifts during specified hours). The test policy table 108 can include policies based on such information.

For example, when the area in the event generation requirements includes a plurality of roads, the test policy table 108 can specify whether to conduct the testing (whether to generate a test case) depending on the type of road. Alternatively, it can specify that different policies in different categories are applied to the different types of roads. The types of road to be specified may include highway, ordinary road, and expressway.

The test policy table 108 may include a policy on the width of road/the number of lanes. When the area in the event generation requirements includes a plurality of roads, the test policy table 108 can specify whether to conduct the testing (whether to generate a test case) depending on the width of road/the number of lanes.

Alternatively, it can specify that different policies in different categories are applied to the different widths of roads/the different numbers of lanes. The width of road/the number of lanes to be specified may be "the width of road=3 to 5 m", "the width of road=5 to 10 m", "the width of road=10 to 20 m", "the number of lanes for each way=1", "the number of lanes for each way=2", the number of lanes for each way=3", and the like.

The test policy table 108 may include policies for time regulations on the road. For example, in testing an advertisement to be displayed only in the morning (the event generation requirements include a requirement on time zone), the test policy table 108 can include a policy not to conduct the testing on the road closed in the morning with reference to the time regulation information included in the map data 109.

As set forth above, the embodiments of this invention have been described; however, this invention is not limited to the foregoing embodiments. Those skilled in the art can easily modify, add, convert, or delete each element in the foregoing embodiments within the scope of this invention.

The test support technique of this invention can be applied to various programs that work in accordance with map data and the position of a mobile object in the map data. For example, in addition to the foregoing example of a car navigation system, the technique can be applied to a navigation program running on a mobile phone, a vehicle control system, an in-door navigation system.

For example, the event generation requirements and the test policies illustrated in FIGS. 3 and 4 may be partially modified to be applied to the testing of a navigation program running on a mobile phone. For example, the value of the speed is adapted to the walking speed of a person and the item of acceleration is deleted. The walking track of a person is on a sidewalk.

The foregoing examples automatically create test data from test cases. Unlike those examples, the developer may actually move the mobile object in accordance with test cases to conduct the testing of a program. The test data is created with movement of the mobile object. The test cases may be created from the event generation requirements and the map data without using test policies.

This invention can be implemented by providing a system or an apparatus with a non-transitory storage medium holding a program code of software for implementing the function in the foregoing embodiments and a computer (a CPU or an MPU) in the system or apparatus retrieves the program code held in the non-transitory storage medium to execute it.

In this case, the program code retrieved from the non-transitory storage medium itself performs the function in the foregoing embodiments and the non-transitory storage medium holding the program code can constitute this invention. The same applies to not only the case where the function in the foregoing embodiments is performed by executing the program code retrieved by the computer but the case where an operating system (OS) running on the computer performs all or a part of the actual processing in accordance with the program code to perform the function of the foregoing embodiment.

This invention can also be implemented by distributing the program code of software for performing the function of the foregoing embodiments via a network, storing the program code in a storage device such as a hard disk or memory in a system or an apparatus or a non-transitory storage medium such as a CD-RW or a CD-R, and retrieving the program code held in the storage device or the non-transitory storage medium by a computer (a CPU or an MPU) in the system or apparatus.

What is claimed is:

1. A test support system for supporting testing of a function of a program that works depending on a position of a mobile object in map information, the test support system comprising:
a processor; and
a storage device,
wherein the storage device holds the map information and event generation requirements information defining requirements for generation of an event in the program,
wherein the requirements for event generation specify a position designated in the map information and requirements on movement of the mobile object with respect to the designated position,
wherein the processor creates a plurality of test cases that are to be referred to in creating test data, the test data to be input to the program for checking whether the event is generated in accordance with the requirements for event generation with reference to the map information and the event generation requirements, each of the plurality of test cases specifying the designated position in the map information and movement of the mobile object with respect to the designated position,
wherein the processor creates a plurality of patterns of movement tracks of the mobile object and a plurality of patterns of each of one or more elements for specifying behavior of the mobile object, and
wherein the processor creates the plurality of test cases using combinations of the plurality of patterns of movement tracks and the plurality of patterns of the behavior of the mobile object.

2. The test support system according to claim 1,
wherein the plurality of test cases includes:
a test case indicating the designated position in the map information and movement of the mobile object with respect to the designated position matching the requirements for event generation; and
a test case indicating the designated position in the map information and movement of the mobile object with respect to the designated position mismatching the requirements for event generation.

3. The test support system according to claim 1,
wherein the storage device further holds test policy information specifying user-configurable test policies to create the plurality of test cases, and
wherein the processor creates the plurality of test cases in accordance with the test policy information.

4. The test support system according to claim 3,
wherein the designated position is included in a designated area in the map information,
wherein the plurality of patterns of movement tracks of the mobile object includes:
a pattern of a track that crosses a boundary of the designated area from an outside of the designated area;
a pattern of a track that crosses the boundary of the designated area from an inside of the designated area;
a pattern of a track that starts from a position outside the designated area and ends immediately before the boundary of the designated area;
a pattern of a track that starts from a position in proximity to the boundary of the designated area inside the designated area and ends at a position inside the designated area;
a pattern of a track that starts from a position inside the designated area and ends immediately before the boundary of the designated area; and
a pattern of a track that starts from a position in proximity to the boundary of the designated area and is located outside the designated area,
wherein the processor adds information indicating whether to generate the event to each of the plurality of test cases.

5. The test support system according to claim 3,
wherein the one or more elements of the behavior of the mobile object includes speed of the mobile object,
wherein the requirements for event generation specifies the speed of the mobile object,
wherein a plurality of patterns of the speed of the mobile object includes:
a pattern of a speed specified by the requirements for event generation;
a pattern of a speed obtained by subtracting a predetermined value from the speed specified by the requirements for event generation; and
a pattern of a speed obtained by adding a predetermined value to the speed specified by the requirements for event generation, and
wherein, in a case where the test policy information specifies a limit value of the speed of the mobile object, the plurality of patterns of the speed of the mobile object includes a pattern of the limit value.

6. The test support system according to claim 3,
wherein the one or more elements of the behavior of the mobile object includes direction of the mobile object,
wherein the requirements for event generation specifies an angular range of the direction of the mobile object,
wherein a plurality of patterns of the direction of the mobile object includes:
a pattern of a middle value of the angular range;
a pattern of a lower limit angle of the angular range;
a pattern of an upper limit angle of the angular range;
a pattern of an angle obtained by subtracting a predetermined value from the lower limit angle; and
a pattern of an angle obtained by adding a predetermined value from the upper limit angle.

7. The test support system according to claim 3, further comprising:
an input device; and
an output device,
wherein the output device outputs an image to define the test policies,
wherein the processor reflects test policies input by the input device through the image to the test policy information, and
wherein, in the image, different policies can be defined for a movement track pattern matching the requirements for event generation and a movement track pattern mismatching the requirements for event generation.

8. The test support system according to claim 3, further comprising:
an input device; and
an output device,
wherein the output device outputs an image to define the requirements for event generation,
wherein the processor reflects requirements for event generation input by the input device through the image to the event generation requirements information, and wherein, in the image, an area and a speed of the mobile object to be included in the requirements for event generation and a test policy to be applied can be defined.

9. The test support system according to claim 3, further comprising:
an input device; and
an output device,
wherein the output device outputs an image to check the plurality of test cases,
wherein the image includes:
a list of at least a part of the plurality of test cases;
a section for displaying a movement track of a test case selected from the list with the input device; and
a section for displaying parameters representing behavior of the mobile object in the selected test case.

10. The test support system according to claim 3,
wherein the map information includes information on road locations and road regulations, and
wherein the test policy information specifies policies based on the road regulations.

11. The test support system according to claim 1,
wherein each of the plurality of test cases specifies a movement track of the mobile object, and
wherein the processor creates dummy data for data to be acquired by the program when the mobile object moves along the movement track defined in each of the plurality of test cases as test data for each of the plurality of test cases.

12. The test support system according to claim 1,
wherein the program works in accordance with positional information on the mobile object acquired by a device for acquiring positional information on the mobile object, and
wherein the processor creates a plurality of test cases different in timing of starting a cycle of acquiring the positional information by the device.

13. A test support method of supporting, by a test support system, testing of a function of a program that works depending on a position of a mobile object in map information, the test support method comprising:
referring to, by the test support system, the map information and event generation requirements information defining requirements for generation of an event in the program, the requirements for event generation specifying a position designated in the map information and requirements on movement of the mobile object with respect to the designated position;
specifying, by the test support system, the designated position in the map information and movement of the mobile object with respect to the designated position with reference to the map information and the event generation requirements information, and creating a plurality of test cases that are to be referred to in creating test data, the test data to be input to the program for checking whether the event is generated in accordance with the requirements for event generation;
creating, by the test support system, a plurality of patterns of movement tracks of the mobile object and a plurality of patterns of each of one or more elements for specifying behavior of the mobile object; and
creating, by the test support system, the plurality of test cases using combinations of the plurality of patterns of movement tracks and the plurality of patterns of the behavior of the mobile object.

14. A computer readable non-transitory storage medium for storing instructions, which, when executed on a test support system, cause the test support system to perform processing for testing of a function of a program that works depending on a position of a mobile object in map information, wherein the processing comprises:
referring to, by the test support system, the map information and event generation requirements information defining requirements for generation of an event in the program, the requirements for event generation specifying a position designated in the map information and requirements on movement of the mobile object with respect to the designated position;
specifying, by the test support system, the designated position in the map information and movement of the mobile object with respect to the designated position with reference to the map information and the event generation requirements information, and creating a plurality of test cases that are to be referred to in creating test data, the test data to be input to the program for checking whether the event is generated in accordance with the requirements for event generation;
creating, by the test support system, a plurality of patterns of movement tracks of the mobile object and a plurality of patterns of each of one or more elements for specifying behavior of the mobile object; and
creating, by the test support system, the plurality of test cases using combinations of the plurality of patterns of movement tracks and the plurality of patterns of the behavior of the mobile object.

* * * * *